United States Patent
Hama

(10) Patent No.: US 10,200,561 B2
(45) Date of Patent: Feb. 5, 2019

(54) COMMUNICATION APPARATUS AND METHOD FOR CONTROLLING THE SAME FOR CHECKING A TRANSMISSION DESTINATION

(71) Applicant: CANON KABUSHIKI KAISHA, Tokyo (JP)

(72) Inventor: Mikio Hama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/413,675

(22) Filed: Jan. 24, 2017

(65) Prior Publication Data

US 2017/0223217 A1    Aug. 3, 2017

(30) Foreign Application Priority Data

Jan. 29, 2016  (JP) ................................. 2016-016368

(51) Int. Cl.
| | | |
|---|---|---|
| G06F 3/12 | (2006.01) |
| H04N 1/32 | (2006.01) |
| H04N 1/00 | (2006.01) |
| H04N 1/44 | (2006.01) |
| H04W 12/06 | (2009.01) |

(52) U.S. Cl.
CPC ..... *H04N 1/32096* (2013.01); *H04N 1/00281* (2013.01); *H04N 1/32406* (2013.01); *H04N 1/4426* (2013.01); *H04W 12/06* (2013.01); *H04N 2201/0093* (2013.01); *H04N 2201/0094* (2013.01); *H04N 2201/3202* (2013.01)

(58) Field of Classification Search
None
See application file for complete search history.

(56) References Cited

U.S. PATENT DOCUMENTS

| | | | | |
|---|---|---|---|---|
| 2009/0051964 | A1* | 2/2009 | Ito | H04N 1/00209 358/1.15 |
| 2009/0109482 | A1 | 4/2009 | Sato | |
| 2012/0257234 | A1* | 10/2012 | Kanuma | H04N 1/32112 358/1.13 |
| 2015/0046975 | A1* | 2/2015 | Kato | H04L 63/08 726/3 |
| 2015/0058971 | A1* | 2/2015 | Mori | G06F 21/31 726/17 |

FOREIGN PATENT DOCUMENTS

| | | |
|---|---|---|
| CN | 101729731 A | 6/2010 |
| JP | 2007-258946 A | 10/2007 |
| JP | 2009-188618 A | 8/2009 |
| JP | 2012-054690 A | 3/2012 |
| JP | 2012-074935 A | 4/2012 |

\* cited by examiner

*Primary Examiner* — Henok A Shiferaw

(74) *Attorney, Agent, or Firm* — Canon U.S.A., Inc., IP Division

(57) ABSTRACT

A method for controlling a communication apparatus includes receiving a transmission destination, acquiring identification information of a user who inputs a transmission destination of image data, requesting identification information of a checker for the transmission destination, acquiring the requested checker identification information, and storing the acquired user identification information and the acquired checker identification information as transmission history information of the image data.

30 Claims, 14 Drawing Sheets

FIG.5

*501* USER DATABASE

| USER ID | USER NAME | PASSWORD |
|---------|-----------|----------|
| 0001 | Sato Taro | ********** |
| 0002 | Koike Norio | ********* |
| 0003 | Takahashi Yoji | *********** |
| 0004 | Maeda Sachiko | ********* |
| ⋮ | | |

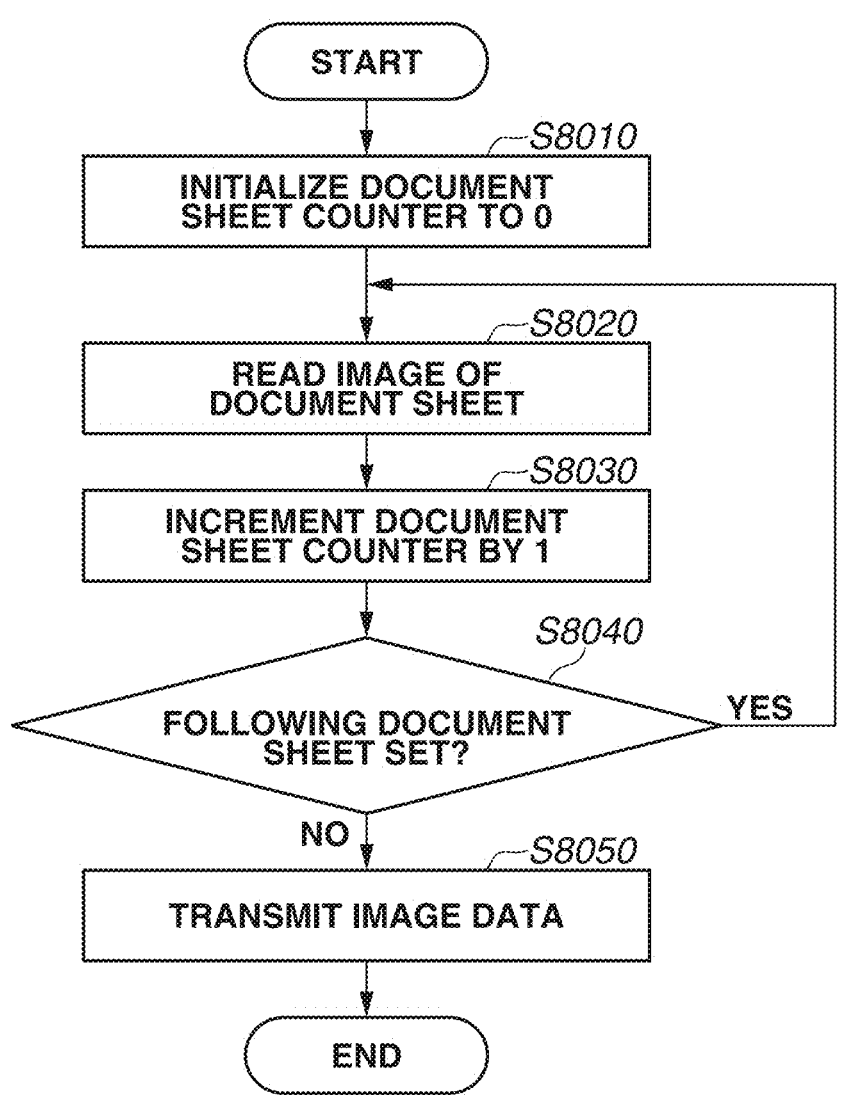

FIG.9A

FACSIMILE TRANSMISSION — 410

| TRANSMISSION DESTINATION | PAPER SIZE | A4 | — 412 |
| --- | --- | --- | --- |
| 00312341234 — 411 | RESOLUTION | 200 × 200 | — 413 |
| | PAPER ORIENTATION | LANDSCAPE | — 414 |

(START) — 415

FIG.9B

FACSIMILE TRANSMISSION: PRE-TRANSMISSION CONFIRMATION SCREEN — 430

☐ — 431  DESTINATION CORRECTLY INPUT?

☐ — 432  TRANSMISSION TARGET DOCUMENT CORRECT?

[CANCEL] — 434   [OK] — 433

FIG.9C

FACSIMILE TRANSMISSION: PRE-TRANSMISSION CONFIRMATION SCREEN — 435

☑ — 431  DESTINATION CORRECTLY INPUT?

☑ — 432  TRANSMISSION TARGET DOCUMENT CORRECT?

[CANCEL] — 434   [OK] — 433

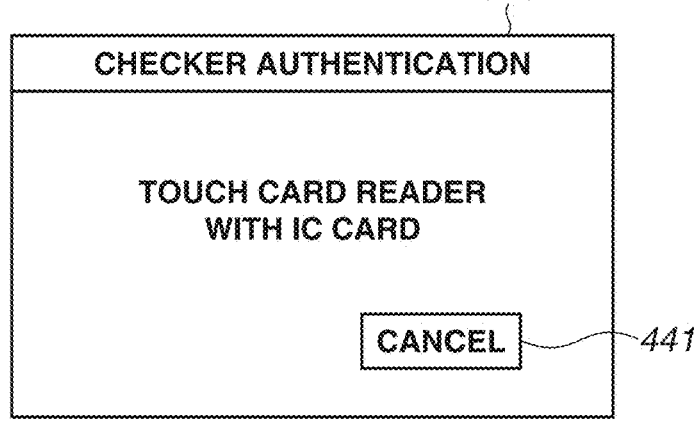
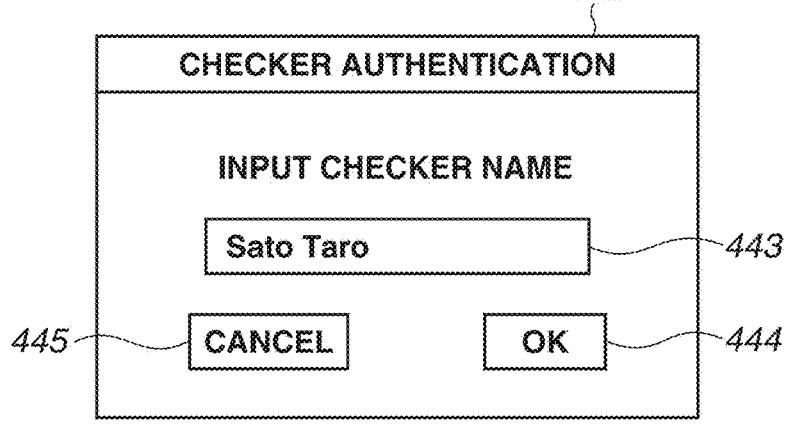
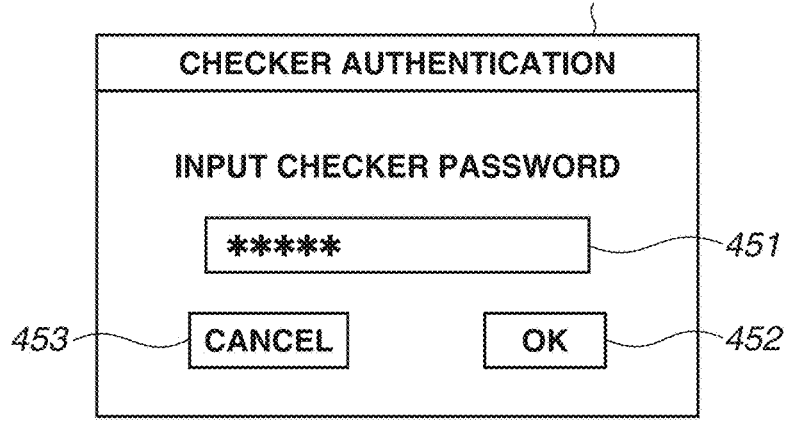

FIG. 11

801 TRANSMISSION HISTORY DATABASE

| MANAGEMENT NUMBER | START TIME | TRANSMISSION DESTINATION | SENDER | CHECKER | COMMUNICATION SHEET COUNT | COMMUNICATION RESULT |
|---|---|---|---|---|---|---|
| 0001 | SEP. 17, 12:30 P.M. | 0031234 1234 | Koike Norio | Sato Taro | 2 | OK |
| 0002 | SEP. 17, 12:40 P.M. | 0037777 0000 | Koike Norio | Maeda Sachiko | 1 | OK |
| 0003 | SEP. 20, 1:30 P.M. | 0037777 0000 | Sato Taro | Takahashi Yoji | 2 | NG |
| 0004 | SEP. 20, 4:00 P.M. | 0037777 0000 | Koike Norio | Sato Taro | 1 | OK |
| ... | | | | | | |

FIG.13

TRANSMISSION HISTORY DISPLAY SCREEN

| START TIME | TRANSMISSION DESTINATION | SENDER (CHECKER) | MANAGEMENT NUMBER | COMMUNICATION SHEET COUNT | COMMUNICATION RESULT |
|---|---|---|---|---|---|
| SEP. 17, 12:30 P.M. | 003123412134 | Koike Norio (Sato Taro) | 0001 | 2 | OK |
| SEP. 17, 12:40 P.M. | 00377770000 | Koike Norio (Maeda Sachiko) | 0002 | 1 | OK |
| SEP. 20, 1:30 P.M. | 00377770000 | Sato Taro (Takahashi Yoji) | 0003 | 2 | NG |
| SEP. 20, 4:00 P.M. | 00377770000 | Koike Norio (Sato Taro) | 0004 | 1 | OK |
| ... | | | | | |

[PRINT] [CLOSE]

FIG. 14

802 TRANSMISSION RESULT REPORT

FACSIMILE TRANSMISSION RESULT REPORT

| START TIME | TRANSMISSION DESTINATION | SENDER (CHECKER) | MANAGEMENT NUMBER | COMMUNICATION SHEET COUNT | COMMUNICATION RESULT |
|---|---|---|---|---|---|
| SEP. 17, 12:30 P.M. | 003123412334 | Koike Norio (Sato Taro) | 0001 | 2 | OK |
| SEP. 17, 12:40 P.M. | 003777770000 | Koike Norio (Maeda Sachiko) | 0002 | 1 | OK |
| SEP. 20, 1:30 P.M. | 003777770000 | Sato Taro (Takahashi Yoji) | 0003 | 2 | NG |
| SEP. 20, 4:00 P.M. | 003777770000 | Koike Norio (Sato Taro) | 0004 | 1 | OK |
| . . . | | | | | |

COMMUNICATION APPARATUS AND METHOD FOR CONTROLLING THE SAME FOR CHECKING A TRANSMISSION DESTINATION

BACKGROUND

Field

The present disclosure relates to a communication apparatus, a method for controlling the communication apparatus, and a storage medium.

Description of the Related Art

Conventionally, if a user specifies an incorrect transmission destination at the time of image transmission from a communication apparatus, such as a facsimile machine, image data will be transmitted to an unintended communication partner.

To prevent such mistransmission, the user transmitting image data from a communication apparatus leads another user to the communication apparatus, and another user visually confirms the contents of an input transmission destination as a checker.

In a conventional technique discussed in Japanese Patent Application Laid-Open No. 2007-258946, an input destination is transmitted to a facsimile server, and facsimile transmission is performed on condition that the destination is confirmed through an operation on a terminal connected to the facsimile server.

In the conventional technique, it is not easy to check afterwards who has confirmed the transmission destination of image data as a checker.

If a checker confirms a transmission destination, put the checker's signature, e.g., stamp their personal seal, to a record book as evidence, and manages the record book, it becomes possible to check afterwards who has confirmed a transmission destination as a checker for each transmission job. In this case, however, it is troublesome to prepare a record book and manage the signed record book.

SUMMARY

According to an aspect of the present invention, a communication apparatus includes an input unit configured to receive a transmission destination from a user, a first acquisition unit configured to acquire identification information of a user who inputs a transmission destination of image data via the input unit, a requesting unit configured to request identification information of a checker of the transmission destination, a second acquisition unit configured to acquire identification information of a checker which is requested by the requesting unit, and a storage unit configured to store the identification information of the user acquired by the first acquisition unit and the identification information of the checker acquired by the second acquisition unit, as transmission history information of the image data.

Further features will become apparent from the following description of exemplary embodiments with reference to the attached drawings.

BRIEF DESCRIPTION OF THE DRAWINGS

FIG. 5 is a diagram illustrating a user database according to the present exemplary embodiment.

FIG. 8 is a flowchart illustrating an example of control according to the present exemplary embodiment.

FIGS. 9A, 9B, and 9C are diagrams illustrating operation screens according to the present exemplary embodiment.

FIGS. 10A, 10B, and 10C are diagrams illustrating operation screens according to the present exemplary embodiment.

FIG. 11 is a diagram illustrating a transmission result database according to the present exemplary embodiment.

FIG. 13 is a diagram illustrating a transmission history display screen according to the present exemplary embodiment.

FIG. 14 is a diagram illustrating a transmission result report according to the present exemplary embodiment.

DESCRIPTION OF THE EMBODIMENTS

An exemplary embodiment will be described below with reference to the accompanying drawings.

Figure 1:
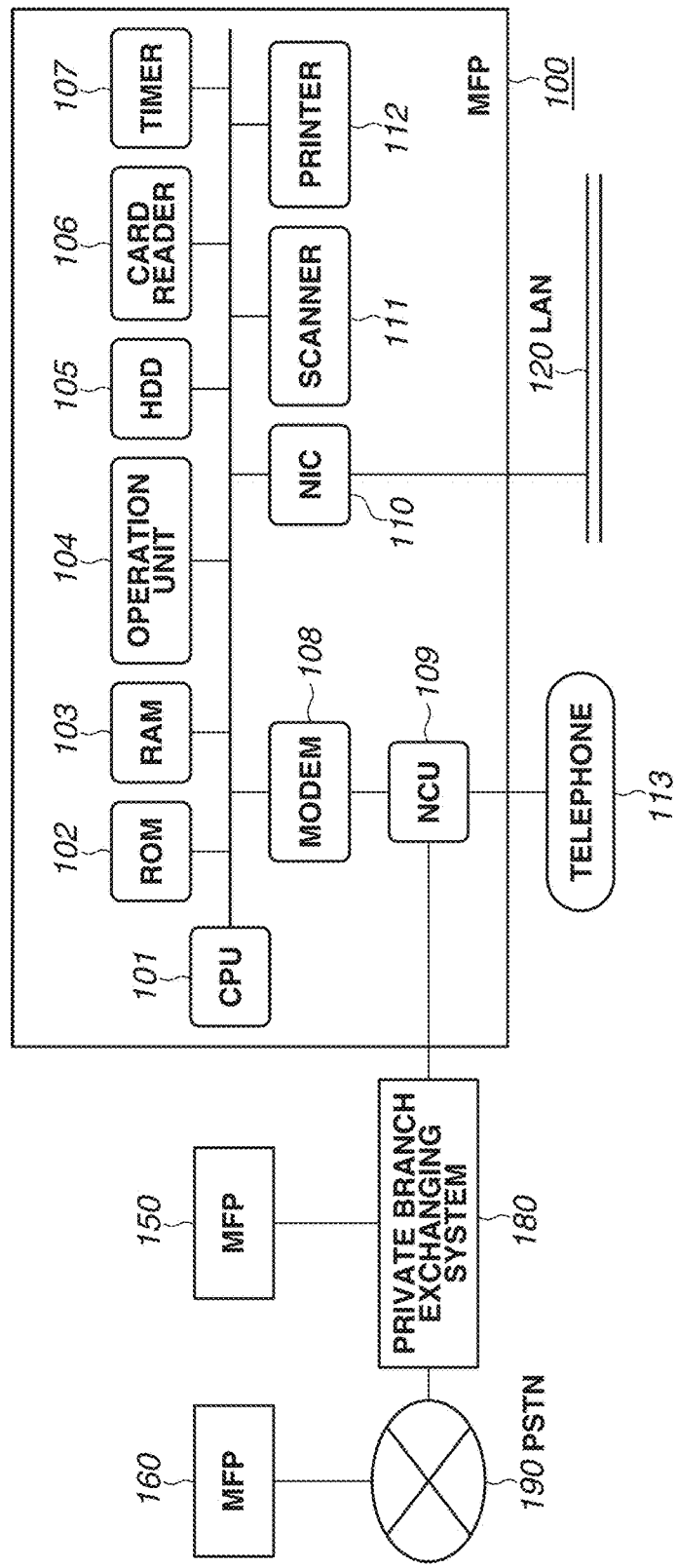
FIG. 1 is a block diagram illustrating a configuration of a communication system according to the present exemplary embodiment.

FIG. 1 is a block diagram illustrating a configuration of a communication system including a multi function peripheral (MFP) 100 as an example of a communication apparatus according to the present exemplary embodiment.

The MFP 100 according to the present exemplary embodiment includes a central processing unit (CPU) 101, a read only memory (ROM) 102, a random access memory (RAM) 103, an operation unit 104, a hard disk drive (HDD) 105, a card reader 106, a timer 107, a modem 108, a network control unit (NCU) 109, a network interface card (NIC) 110, a scanner 111, and a printer 112. The MFP 100 is connected with a telephone 113.

The MFP 100 is connected with a MFP 150 via a private branch exchanging system 180 and communicates with the MFP 150 connected to an extension via the private branch exchanging system 180. The MFP 100 communicates with an MFP 160 via the private branch exchanging system 180 and a public switched telephone network (PSTN) 190.

The CPU 101 integrally controls the MFP 100 by loading a program stored in the ROM 102 or the HDD 105 into the RAM 103 and then executing the program.

The ROM 102 stores programs to be read and executed by the CPU 101.

The RAM 103 functions as a work area for the CPU 101. The RAM 103 stores data and a program read by the CPU 101.

The operation unit 104 includes hardware keys and a display unit provided with a touch panel. The operation unit 104 displays operation screens and statuses of the MFP 100 on the display unit. The operation unit 104 receives an operation from a user via the hardware keys or the touch panel.

The HDD 105 is a mass storage nonvolatile memory for storing programs and image data. A Blu-ray disc or a solid state drive (SSD) can be used instead of the HDD 105.

The card reader 106 is an integrated circuit (IC) card reader for wirelessly reading information in an IC card that is brought close to the card reader 106 by the user. The IC card reader can be replaced with a system for reading information from a magnetic tape on a card. The card reader 106 is provided to the MFP 100 as an optional apparatus which is detachably attached to the MFP 100.

The timer 107 manages the present time.

The modem 108 modulates and demodulates a signal subjected to facsimile communication. More specifically, the modem 108 modulates data to be transmitted from the MFP 100 by facsimile and demodulates data received by facsimile.

The NCU 109 exchanges information with the private branch exchanging system 180 based on a predetermined procedure. For example, the NCU 109 transmits and receives a dial signal to enable the MFP 100 to perform communication via the PSTN 190.

The NIC 110 controls network communication performed by the MFP 100 via a local area network (LAN) 120. The MFP 100 performs network communication with external personal computers (PCs) and MFPs via the NIC 110 and the LAN 120.

The scanner 111 reads an image of a document sheet placed on a document positioning plate to generate image data representing the image of the read document sheet. The scanner 111 has an auto document feeder (ADF) for sequentially conveying a plurality of sheets one by one. When using the ADF, the scanner 111 reads an image of a document sheet conveyed by the ADF to generate image data representing the image of the document sheet. The generated image data is stored in the HDD 105.

The printer 112 feeds a sheet and prints an image on the fed sheet. Image printing is performed based on image data of the document sheet read by the scanner 111, image data received via the NCU 109, or image data received via the LAN 120.

The MFPs 150 and 160 have a similar configuration to the configuration of the MFP 100, and detailed description thereof will be omitted.

The private branch exchanging system 180 receives a call from the MFP 100. If an external call number is added to the header of the destination, the private branch exchanging system 180 makes a call to the PSTN 190. If an external call number is not added to the header of the destination, the private branch exchanging system 180 makes a call to the MFP 150.

Figure 2:
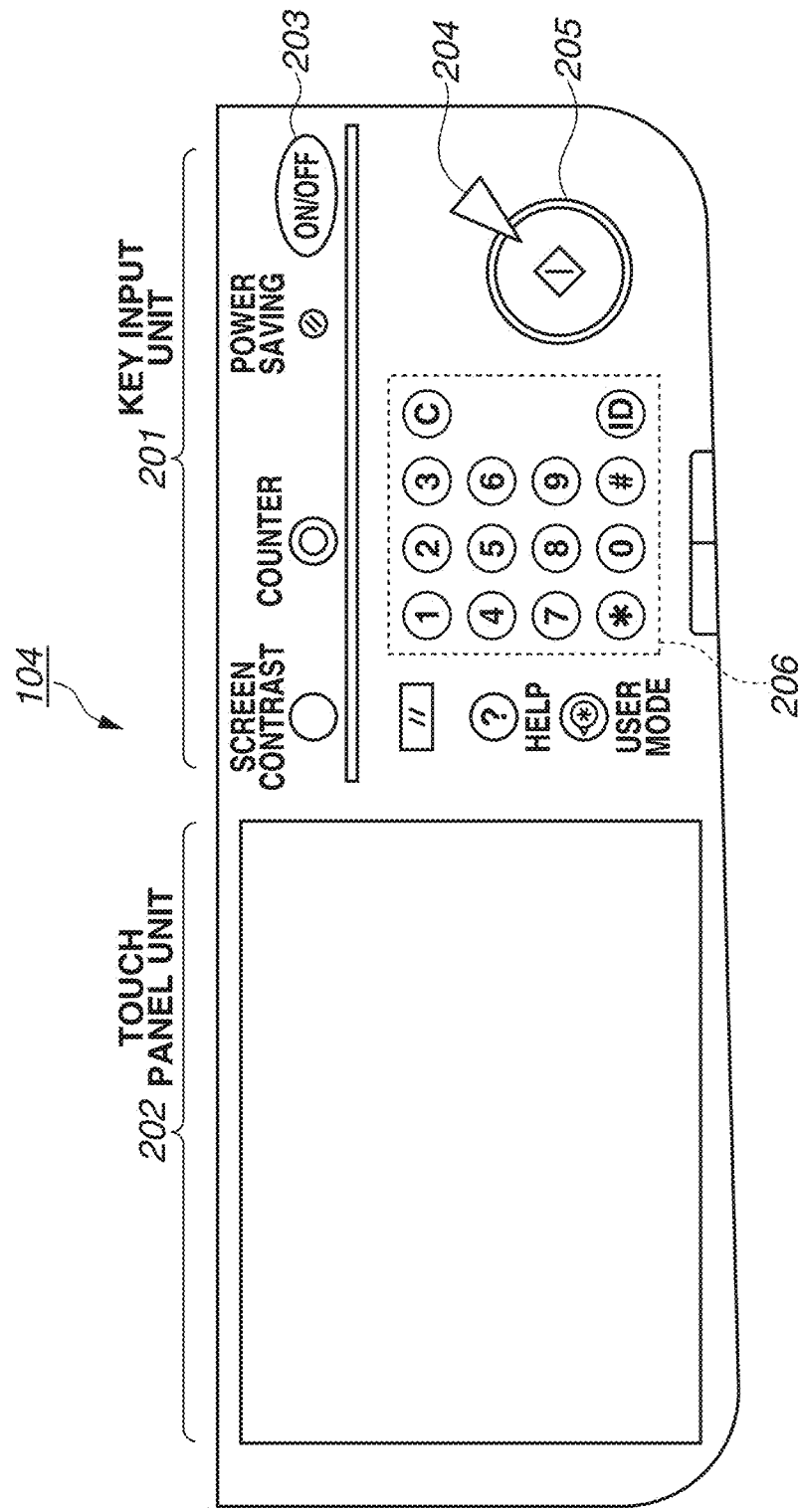
FIG. 2 illustrates an operation unit according to the present exemplary embodiment.

FIG. 2 illustrates the operation unit 104 illustrated in FIG. 1.

The operation unit 104 includes a key input unit 201 for receiving a user operation via hardware keys, and a touch panel unit 202 for receiving a user operation via software keys.

As illustrated in FIG. 2, the key input unit 201 is provided with an operation unit power switch 203. When the user presses the operation unit power switch 203 while the MFP 100 is in the standby mode (normal operation state), the CPU 101 switches the mode of the MFP 100 from the standby mode to the sleep mode, in which power consumption is smaller than power consumption in the normal operation state. When the user presses the operation unit power switch 203 while the MFP 100 is in the sleep mode, the CPU 101 switches the mode of the MFP 100 from the sleep mode to the standby mode.

A start key 205 is a key for receiving from the user, for example, an instruction for instructing the MFP 100 to execute a copy job or a transmission job.

The stop key 204 is a key for receiving from the user, for example, an instruction for interrupting a copy job or a transmission job currently being executed.

Numeric keypads 206 are keys for receiving from the user, for example, the setting of the number of copies and a telephone number.

The touch panel unit 202 includes a liquid crystal display (LCD) unit and a touch panel sheet consisting of transparent electrodes stuck on the LCD unit. The LCD displays operation screens and statuses of the MFP 100. The touch panel sheet is used to receive an operation from the user when an operation screen is displayed on the LCD.

The user operates the operation unit 104 to input a destination and presses the start key 205 to request the MFP 100 to execute a transmission job. Examples of the transmission job include a transmission job for transmitting to the LAN 120 by E-mail the image data that is generated by reading an image of a document sheet using the scanner 111. Another example of the transmission job is a transmission job for transmitting by facsimile via the NCU 109 the image data generated by reading an image of a document sheet using the scanner 111. The present exemplary embodiment will be described below using facsimile transmission as an example of the transmission job.

Upon receipt of a facsimile transmission instruction, the MFP 100 instructs the scanner 111 to read an image of a document sheet to generate image data and performs facsimile transmission of the generated image data via the NCU 109.

If the user inputs a wrong destination, the image data will be transmitted to an unintended destination.

Therefore, in the MFP 100 according to the present exemplary embodiment, another user, i.e., checker, who is different from the user as a sender confirms the input destination. The checker inputs the checker's identification information to the MFP 100. Then, upon input of the checker's identification information, the MFP 100 transmits the image data.

This enables preventing the occurrence of mistransmission.

The MFP 100 stores the checker's identification information in the HDD 105 as history information to allow the history information to be printed afterwards. This enables easily identifying afterwards a person who confirmed the transmission destination as a checker for each transmission job.

The above-described procedure enables, even without performing a complicated procedure in which the checker signs a record book and manages the signed record book, easily confirming afterwards a person who confirmed the transmission destination of image data as a checker, by operating the MFP 100.

This also enables checking afterwards whether a checker, other than the sender, has confirmed the destination for each transmission job.

Processing associated with the above-described discussion will be described in detail below.

<Login Processing>

A login procedure performed by the sender to log into the MFP 100 will be described below with reference to FIG. 3. The processing in the flowchart illustrated in FIG. 3 is implemented in such a manner that the CPU 101 loads a program stored in the ROM 102 into the RAM 103 and then executes the program.

Figure 3:
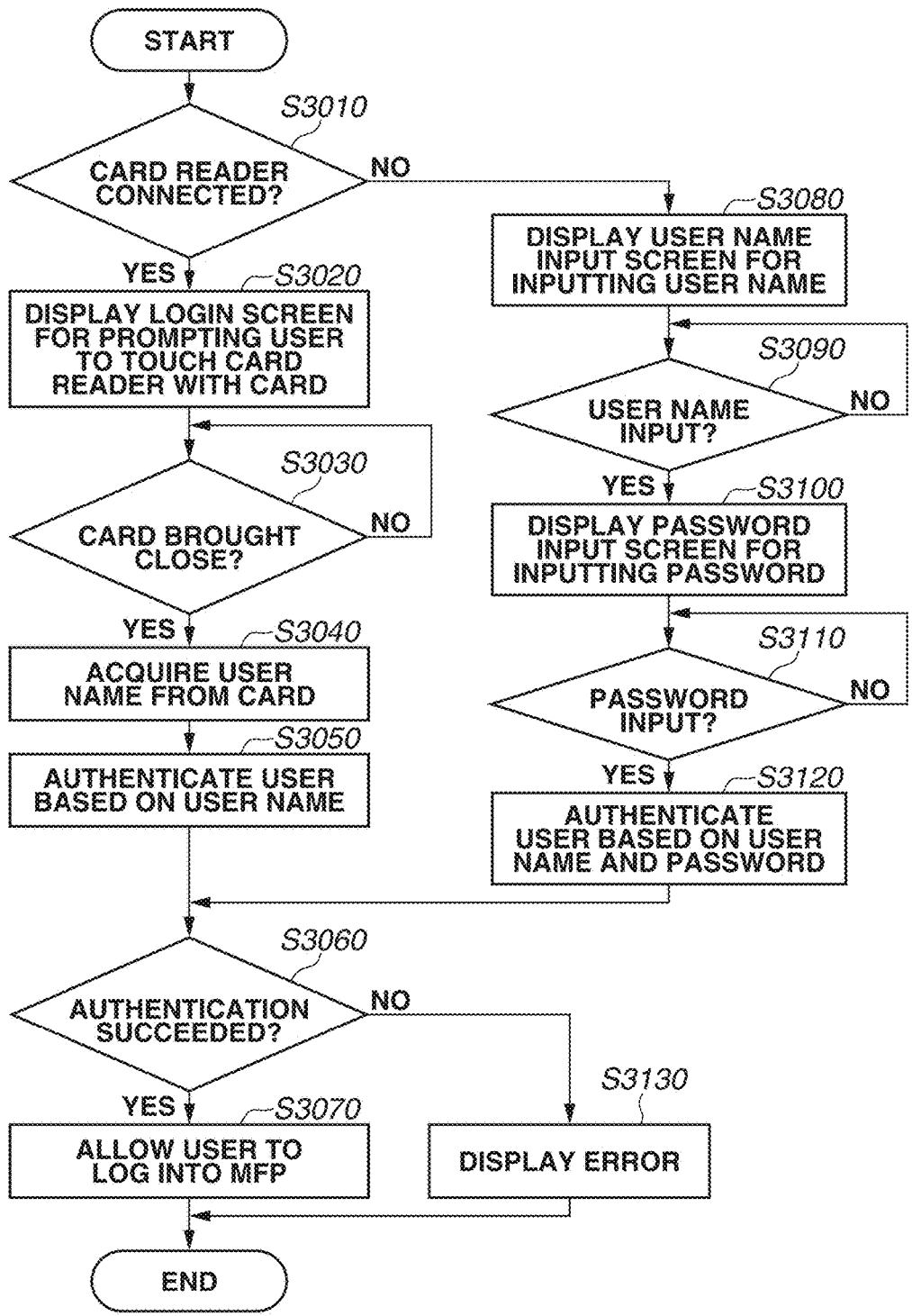
FIG. 3 is a flowchart illustrating an example of control according to the present exemplary embodiment.

The processing in the flowchart illustrated in FIG. 3 is started when the MFP 100 is activated and in a state that the user logs out of the MFP 100.

In step S3010, the CPU 101 determines whether the card reader 106 is connected to the MFP 100. In a case where the CPU 101 determines that the card reader 106 is connected (YES in step S3010), the processing proceeds to step S3020. In a case where the CPU 101 determines that the card reader 106 is not connected (NO in step S3010), the processing proceeds to step S3080.

Figure 4A:
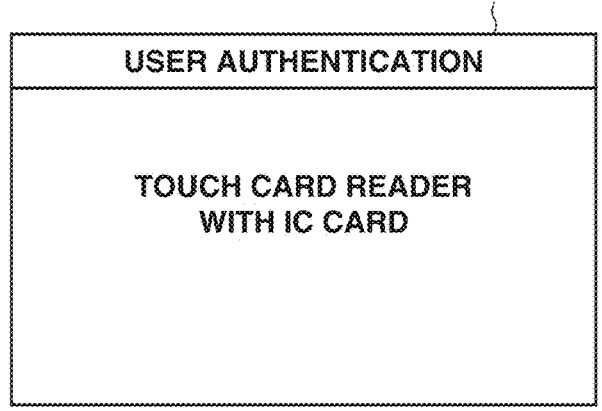
FIGS. 4A, 4B, and 4C are diagrams illustrating operation screens according to the present exemplary embodiment.

In step S3020, the CPU 101 displays on the operation unit 104 a login screen prompting the user to touch the card reader 106 with a card. FIG. 4A is a diagram illustrating an example of a login screen. A login screen 401 displays a message "touch card reader with IC card".

In step S3030, the CPU 101 determines whether an IC card is brought close to the card reader 106. A noncontact IC card can be used as an IC card. When the IC card is brought close to the card reader 106 and the distance between the IC card and the card reader 106 becomes a predetermined distance, an IC chip in the IC card wirelessly communicates with the card reader 106. When the card reader 106 detects that wireless communications is performed, the card reader 106 notifies the CPU 101 of the completion of the wireless communication. Then, the CPU 101 determines that the IC card is brought in proximity to the card reader 106. When the CPU 101 determines that the IC card is not brought in proximity to the card reader 106 (NO in step S3030), the CPU 101 repeats processing in step S3030 until the IC card is brought in proximity to the card reader 106. When the CPU 101 determines that the IC card is brought in proximity to the card reader 106 (YES in step S3030), the processing proceeds to step S3040.

In step S3040, the CPU 101 wirelessly communicates with the IC card brought in proximity to the card reader 106, acquires from the IC card the user name stored in the IC card, and stores the user name in the RAM 103.

In step S3050, the CPU 101 authenticates the user based on the user name acquired in step S3040. More specifically, the CPU 101 authenticates the user by determining whether the user name acquired in step S3040 is registered in a user database 501 illustrated in FIG. 5. The user database 501 is stored in the HDD 105 and is referenced by the CPU 101. The user database 501 includes user identifier (ID), user name, and password. It is desirable from a security viewpoint to encrypt these pieces of information before storing them in the HDD 105 and to decrypt them when they are read from the HDD 105.

If the user name acquired in step S3040 and stored in the RAM 103 is registered in the user database 501, user authentication succeeds. If the user name acquired in step S3040 and stored in the RAM 103 is not registered in the user database 501, user authentication fails.

Figure 4B:
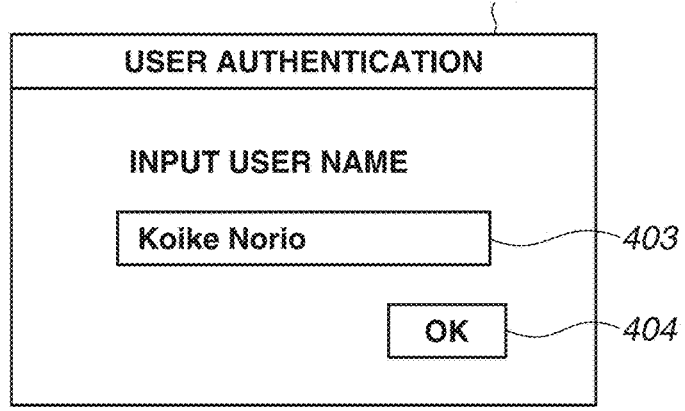

In step S3080 (NO in step S3010), the CPU 101 displays a user name input screen for inputting a user name on the operation unit 104. FIG. 4B is a diagram illustrating an example of a user name input screen. A user name input screen 402 displays a message "input user name", a user name input area 403, and an OK button 404. When the user selects the user name input area 403, a software keyboard for inputting alphanumeric characters is displayed. The user inputs a user name via the software keyboard.

In step S3090, the CPU 101 determines whether a user name is input. In a case where the user does not press the OK button 404 (NO in step S3090), the CPU 101 repeats the processing in step S3090 until the OK button 404 is pressed. In a case where the user presses the OK button 404 (YES in step S3090), the CPU 101 stores in the RAM 103 the user name input in the user name input area 403. Then, the processing proceeds to step S3100.

Figure 4C:
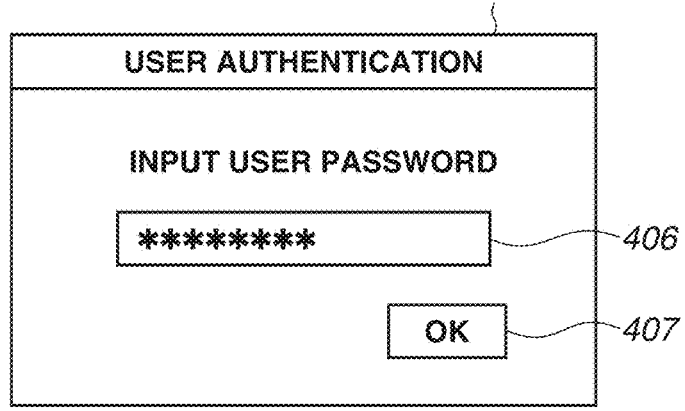

In step S3100, the CPU 101 displays a password input screen for inputting a password on the operation unit 104. FIG. 4C is a diagram illustrating an example of a password input screen. A password input screen 405 displays a message "input user password", a password input area 406, and an OK button 407. When the user selects the password input area 406, the software keyboard for inputting alphanumeric characters is displayed. The user inputs a password via the software keyboard.

In step S3110, the CPU 101 determines whether a password is input. In a case where the user does not press the OK button 407 (NO in step S3110), the CPU 101 repeats processing in step S3110 until the OK button 407 is pressed. In a case where the user presses the OK button 407 (YES in step S3110), the CPU 101 stores the input password in the RAM 103. Then, the processing proceeds to step S3120.

In step S3120, the CPU 101 authenticates the user based on the user name and the password stored in the RAM 103. More specifically, the CPU 101 authenticates the user by determining whether the user name and the password stored in the RAM 103 are registered in the user database 501 illustrated in FIG. 5. When the user name and the password stored in the RAM 103 matches ones registered in the user database 501, user authentication succeeds. When the user name and the password stored in the RAM 103 are not registered in the user database 501, user authentication fails.

In step S3060, the CPU 101 determines whether user authentication has succeeded or failed. In a case where the CPU 101 determines that the user authentication has succeeded (YES in step S3060), the processing proceeds to step S3070. In a case where the CPU 101 determines that user authentication has failed (NO in step S3060), the processing proceeds to step S3130.

In step S3070, the CPU 101 allows the authenticated user to log into the MFP 100 and to use the MFP 100. Then, the CPU 101 displays a job setting screen on the operation unit 104.

In step S3130 (NO in step S3060), the CPU 101 displays on the operation unit 104 an error screen indicating that authentication has failed.

This completes the login processing.

<Executing Transmission Job and Storing Transmission History>

After logging into the MFP 100, the user sets a transmission job via a displayed job setting screen. The job setting screen for setting a transmission job can be displayed immediately after user login to the MFP 100. Alternatively, the job setting screen can be displayed upon selection of the transmission function from a function selection screen after user login to the MFP 100.

Figure 6:
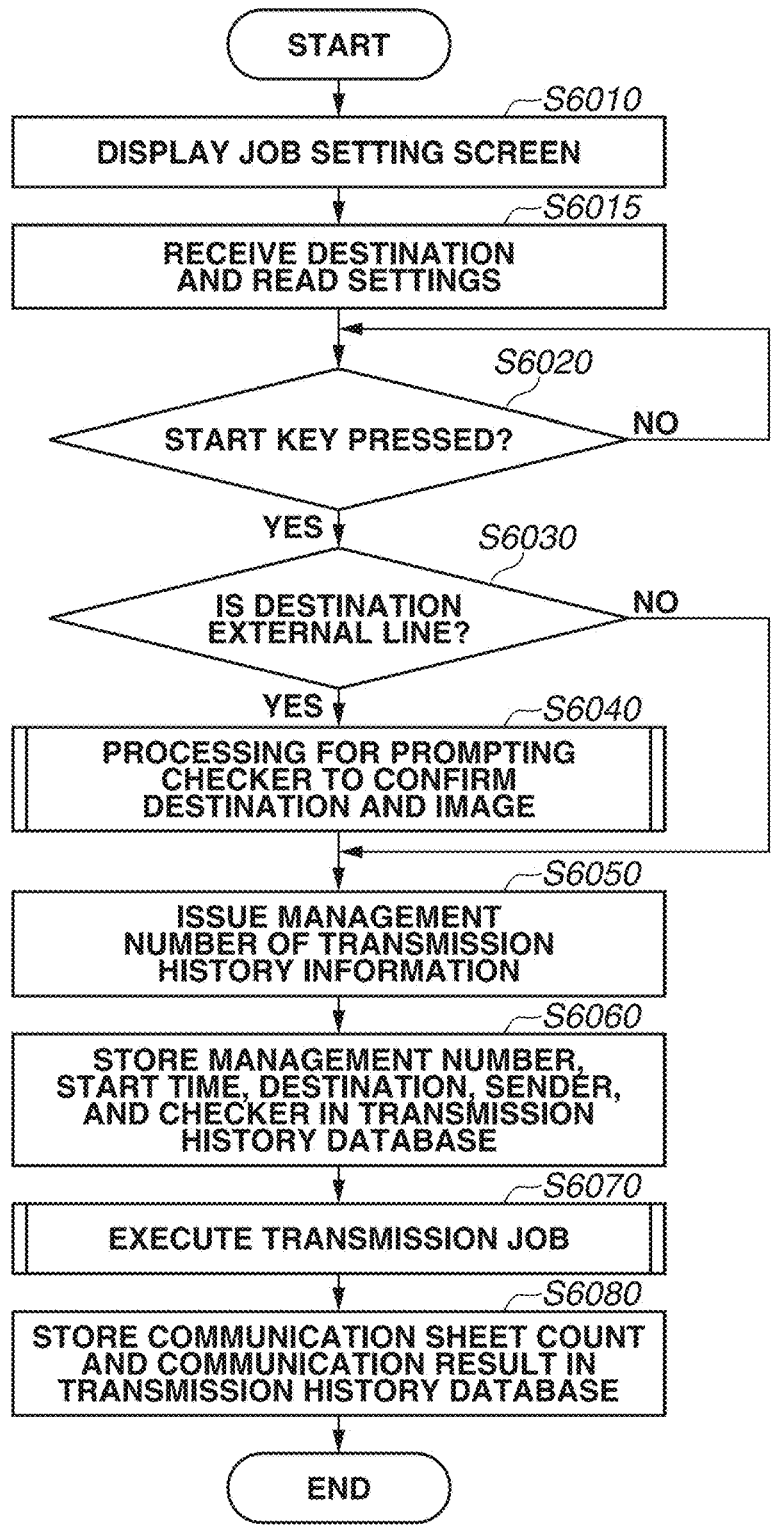
FIG. 6 is a flowchart illustrating an example of control according to the present exemplary embodiment.

FIG. 6 is a flowchart illustrating processing in which the user logs into the MFP 100, executes a transmission job, and stores the history information of the transmission job. The processing in the flowchart illustrated in FIG. 6 is implemented in such a manner that the CPU 101 loads a program stored in the ROM 102 into the RAM 103 and then executes the program.

In step S6010, the CPU 101 displays the job setting screen on the operation unit 104. The MFP 100 displays the job setting screen for setting a copy job, the job setting screen for setting an E-mail transmission job, and the job setting screen for setting a facsimile transmission job. The present exemplary embodiment will be described below using an example of processing that is performed after the job setting screen for setting a facsimile transmission job is displayed.

In step S6015, the CPU 101 receives a destination and detailed settings via the job setting screen. FIG. 9A is a diagram illustrating an example of a job setting screen. A job setting screen 410 is a transmission job setting screen. The transmission job setting screen 410 includes a destination input area 411, a paper size setting field 412, a resolution setting field 413, a paper orientation setting field 414, and a start key 415. The destination input area 411 is used to set a transmission destination of image data. The paper size setting field 412 is used to set the size of the paper to be used at the destination. The resolution setting field 413 is used to set the transmission resolution of image data. The paper orientation setting field 414 is used to set the orientation of the paper to be used at the destination.

The user touches the destination input area 411 and operates the numeric keypads 206 to input a destination. The user can change detailed settings as required. For example, the user can change the resolution setting field 413 from 200 dpi×200 dpi to 400 dpi×400 dpi. The changed settings are stored in the HDD 105 by the CPU 101. Detailed settings are not limited to those illustrated in FIG. 9A and can include other settings such as switching between memory transmission and direct transmission.

In step S6020, the CPU 101 determines whether the start key 205 as a hardware key or the start key 415 as a software key is pressed. In a case where neither the start key 205 nor the start key 415 is pressed (NO in step S6020), the CPU 101 repeats the processing in step S6020 until either the start key 205 or the start key 415 is pressed. In a case where the start key 205 or the start key 415 is pressed (YES in step S6020), the CPU 101 determines that a transmission request is received. Then, the processing proceeds to step S6030.

In step S6030, the CPU 101 determines whether the destination input in a destination input field 411 is an external line or an extension. When a call is made to an external line, the external line number generally starts with 00, which is a combination of the external call number 0 and the starting number 0 of the area code. In a case where the destination input in the destination input field 411 starts with 00, the CPU 101 determines that the destination is an external line (YES in step S6030). In a case where the destination input in the destination input field 411 starts with a number other than 00, the CPU 101 determines that the destination is an extension (NO in step S6030). Alternatively, the CPU 101 can determine that the destination is an external line in a case where the number of digits of the destination is more than a predetermined number. The CPU 101 can determine that the destination is an extension in a case where the number of digits of the destination is less than the predetermined number. In a case where the CPU 101 determines that the destination input in the destination input field 411 is an external line (YES in step S6030), the processing proceeds to step S6040. In a case where the CPU 101 determines that the destination input in the destination input field 411 is an extension (NO in step S6030), the processing skips step S6040 and proceeds to step S6050.

Figure 7:
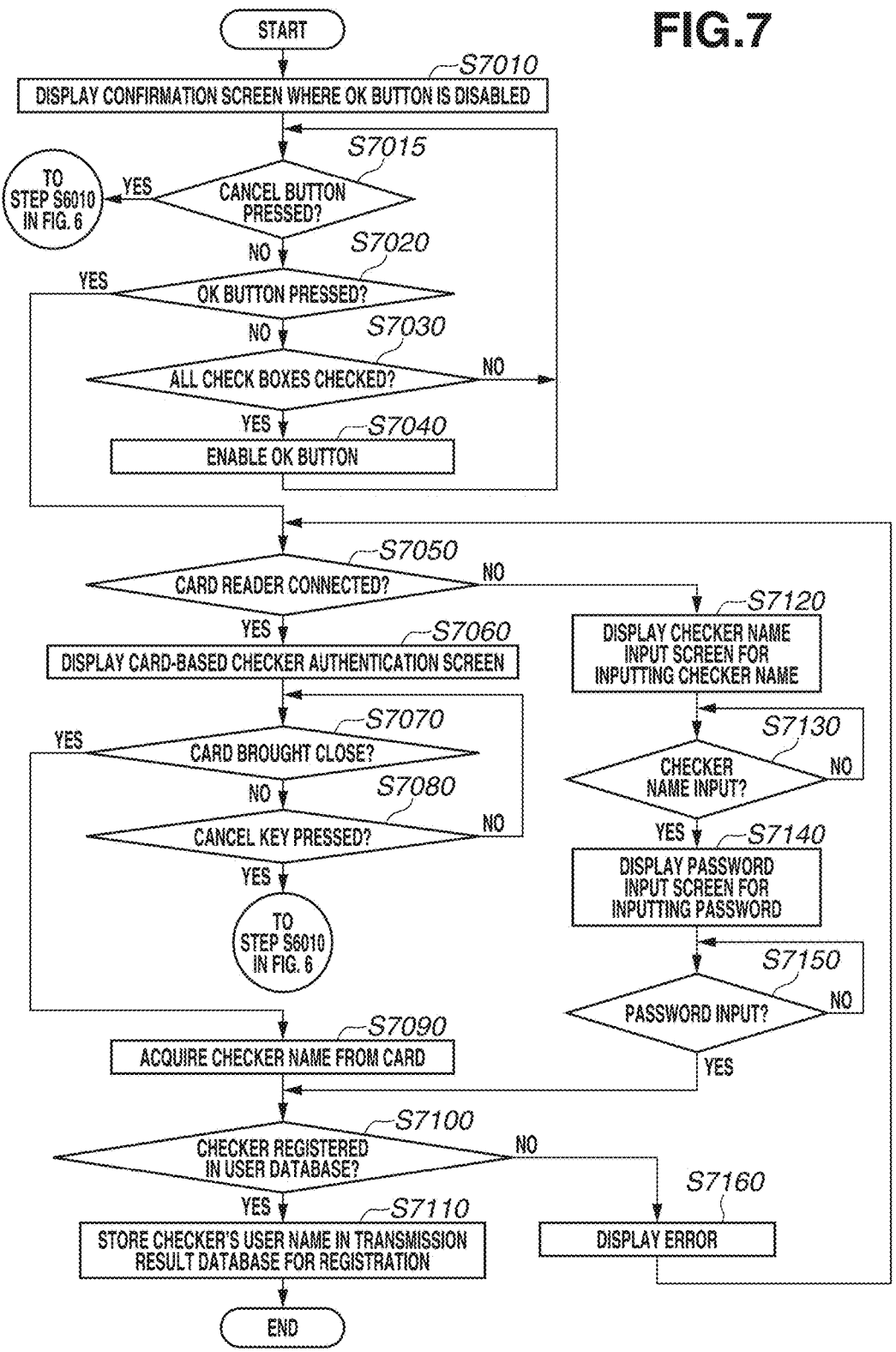
FIG. 7 is a flowchart illustrating an example of control according to the present exemplary embodiment.

In step S6040, the CPU 101 performs processing for prompting the checker to confirm the destination and the transmission target image. The processing in step S6040 will be described below with reference to the flowchart illustrated in FIG. 7. The processing in the flowchart illustrated in FIG. 7 is implemented in such a manner that the CPU 101 loads a program stored in the ROM 102 into the RAM 103 and then executes the program.

In step S7010, the CPU 101 displays a confirmation screen, an example of which is illustrated in FIG. 9B, on the operation unit 104. A confirmation screen 430 is a screen for prompting the checker to confirm the destination and the image.

The confirmation screen 430 includes check boxes 431 and 432. The confirmation screen 430 also includes an OK button 433 and a cancel button 434. In the initial state, both the check boxes 431 and 432 are unchecked. In the confirmation screen 430, the OK button 433 is grayed out or disabled. After the checker confirms that the destination input by the sender is correct, the checker selects the check box 431. When the check box 431 is selected, the CPU 101 displays a check mark for the check box 431. After the checker confirms that the document set to the scanner 111 by the sender is correct, the checker selects the check box 432 and the CPU 101 displays a check mark for the check box 432. Thus, the checker checks whether the destination and the document have been confirmed.

In step S7015, the CPU 101 determines whether the cancel button 434 is pressed. In a case where the CPU 101 determines that the cancel button 434 is pressed (YES in step S7015), the processing proceeds to step S6010 illustrated in FIG. 6. In a case where the CPU 101 determines that the cancel button 434 is not pressed (NO in step S7015), the processing proceeds to step S7020.

In step S7020, the CPU 101 determines whether the OK button 433 is pressed. In a case where the OK button 433 is not pressed (NO in step S7020), the processing proceeds to step S7030. In a case where the OK button 433 is pressed (YES in step S7020), the processing proceeds to step S7050.

In step S7030, the CPU 101 determines whether all of the check boxes are selected. In a case where the CPU 101 determines that all of the check boxes are selected (YES in step S7030), the processing proceeds to step S7040. In a case where the CPU 101 determines that either one of the check boxes is not selected (NO in step S7030), the processing returns to step S7015.

In step S7040, the CPU 101 enables the OK button 433. FIG. 9C is a diagram illustrating a confirmation screen displayed on the operation unit 104 at this time. Then, the processing proceeds to step S7015. In the present exemplary embodiment, the CPU 101 provides an inquiry prompt to the checker about whether the user confirmed the destination and the transmission target document. The CPU 101 inhibits image data transmission by disabling the confirmation screen from shifting to the next screen, until the checker confirms using the check boxes. This enables preventing the checker from forgetting to confirm the destination and the document.

In step S7050 (YES in step S7020), the CPU 101 determines whether the card reader 106 is connected to the MFP 100. In a case where the CPU 101 determines that the card reader 106 is connected to the MFP 100 (YES in step S7050), the processing proceeds to step S7060. In a case where the CPU 101 determines that the card reader 106 is not connected to the MFP 100 (NO in step S7050), the processing proceeds to step S7120.

In step S7060, the CPU 101 displays a checker authentication screen, an example of which is illustrated in FIG. 10A, on the operation unit 104. A checker authentication screen 440 includes a cancel button 441. When the checker views the checker authentication screen 440, the checker brings an IC card held by the checker in proximity to the card reader 106.

In step S7070, the CPU 101 determines whether the IC card is in proximity to the card reader 106. The method of determination is similar to the method in step S3030. In a case where the CPU 101 determines that the IC card is not in proximity to the card reader 106 (NO in step S7070), the processing proceeds to step S7080. In a case where the CPU 101 determines that the IC card is in proximity to the card reader 106 (YES in step S7070), the processing proceeds to step S7090.

In step S7080, the CPU 101 determines whether the cancel button 441 illustrated in FIG. 10A is pressed. In a case where the CPU 101 determines that cancel button 441 is not pressed (NO in step S7080), the processing proceeds to step S7070. In a case where the CPU 101 determines that the cancel button 441 is pressed (YES in step S7080), the processing proceeds to step S6010 illustrated in FIG. 6. In this case, the CPU 101 can cancel the set destination and detailed settings and set them to the default values, or leave the destination and detailed settings without cancelling them and accept changes of settings.

In step S7090, the CPU 101 wirelessly communicates with the IC card in proximity to acquire from the IC card the checker name stored in the IC card, and stores the checker name in the RAM 103.

This completes the method for acquiring the checker's identification information using an IC card.

In step S7120 (NO in step S7050), the CPU 101 displays a checker name input screen illustrated in FIG. 10B on the operation unit 104. The checker name input screen 442 includes a checker name input area 443, an OK button 444, and a cancel button 445. When the user selects the checker name input area 443, the software keyboard for inputting alphanumeric characters is displayed. The user inputs a user name via the software keyboard.

In step S7130, the CPU 101 determines whether a checker name is input. The CPU 101 determines that the checker name is input upon selection of the OK button 444. In a case where the checker name is not input (NO in step S7130), the CPU 101 repeats the processing in step S7130 until the checker name is input. In a case where the CPU 101 determines that the checker name is input (YES in step S7130), the processing proceeds to step S7140. If the cancel button 445 is pressed, the processing can proceed to step S6010 illustrated in FIG. 6.

In step S7140, the CPU 101 displays a password input screen 450 illustrated in FIG. 10C on the operation unit 104. The password input screen 450 includes a password input field 451, an OK button 452, and a cancel button 453. When the user selects the password input field 451, the software keyboard for inputting alphanumeric characters is displayed. The user inputs a user name via the software keyboard.

In step S7150, the CPU 101 determines whether a password is input. The CPU 101 determines that a password is input upon selection of the OK button 452. In a case where the CPU 101 determines that a password is not input (NO in step S7150), the CPU 101 repeats the processing in step S7150 until a password is input. In a case where the CPU 101 determines that a password is input (YES in step S7150), the processing proceeds to step S7100. If the cancel button 453 is pressed, the processing can proceed to step S6010 illustrated in FIG. 6.

In step S7100, the CPU 101 determines whether the checker is registered in the user database 501. In a case where the CPU 101 determines that the checker is registered in the user database 501 (YES in step S7100), the processing proceeds to step S7110. In a case where the CPU 101 determines that the checker is not registered in the user database 501 (NO in step S7100), the processing proceeds to step S7160.

In step S7110, the CPU 101 stores the checker's user name in the HDD 105 as information to be stored in a transmission history database (described below). Then, the processing proceeds to step S6050 illustrated in FIG. 6.

In step S7160 (NO in step S7100), the CPU 101 displays on the operation unit 104 an error screen indicating that the checker is not a valid checker. Then, the processing proceeds to step S7050.

The flowchart illustrated in FIG. 6 will be described again below. In step S6050, the CPU 101 issues a management number to add the transmission history record of a transmission job to be newly executed to the transmission history database and stores the management number in the transmission history database. FIG. 11 is a diagram illustrating an example of a transmission history database. In addition to the management number, a transmission history database 801 includes start time, a destination, a sender, a checker, a communication sheet count, and a communication result.

In step S6060, the CPU 101 stores the management number issued in step S6050 in the transmission history database 801 and, in association with the management number, stores start time, a destination, a sender, and a checker of the transmission job that has been determined at this timing in the transmission history database 801. More specifically, the CPU 101 acquires the present time from the timer 107 and, in association with the management number issued in step S6050, stores the acquired present time in the column of start time. The CPU 101 acquires the destination set in step S6015 and, in association with the management number issued in step S6050, stores the acquired destination in the column of destination. The CPU 101 also stores the sender's user name authenticated in step S3050 or S3120 illustrated in FIG. 3 in the column of sender. The CPU 101 stores the checker's user name stored in step S7110 in the column of checker. These pieces of information are determined before reading a document sheet, and therefore can be stored in the transmission history database 801 at this timing.

In step S6070, the CPU 101 executes a transmission job. Processing in step S6070 will be described in detail below with reference to FIG. 8. The processing in the flowchart illustrated in FIG. 8 is implemented in such a manner that the CPU 101 loads a program stored in the ROM 102 into the RAM 103 and then executes the program.

In step S8010, the CPU 101 prepares in the RAM 103 a document sheet counter (variable) for counting the number of document sheets and initializes the value of the document sheet counter to 0.

In step S8020, the CPU 101 instructs the scanner 111 to read a document sheet based on the detailed settings. The scanner 111 starts conveying the first document sheet set on the ADF according to an instruction, and reads the image of the conveyed document sheet to generate image data representing the image of the read document sheet. The CPU 101 stores the generated image data in the HDD 105.

In step S8030, to count the number of document sheets, the CPU 101 increments the value of the document sheet counter stored in the RAM 103 by one.

In step S8040, the CPU 101 determines whether the ADF has the successive document sheet by using a document detection sensor provided on the ADF. In a case where the CPU 101 determines that the ADF has the successive document sheet (YES in step S8040), the processing proceeds to step S8020. In a case where the CPU 101 determines that the ADF does not have the successive document sheet (NO in step S8040), the processing proceeds to step S8050.

In step S8050, the CPU 101 transmits the image data stored in the HDD 105 to the destination input in step S6015 via the modem 108 and the NCU 109.

The present exemplary embodiment has been described above using an example of memory transmission in which, after all the document sheets have been read, image data of the first document sheet is transmitted. However, the present exemplary embodiment is not limited thereto, and can perform direct transmission in which, after each document sheet has been read and transmitted, the successive document sheet is read and transmitted.

The flowchart illustrated in FIG. 6 will be described again below. In step S6080, the CPU 101 stores the value of the document sheet counter in the RAM 103 counted in step S8030, as the communication sheet count, in association with the management number in the transmission history database 801 issued in step S6050. The CPU 101 stores the communication result in the column of the communication result in association with the management number issued in step S6050. When image transmission for the last document sheet is completed without an error occurrence, "OK" is stored as the communication result. If an error occurs before image transmission for the last document sheet is completed, "NG" is stored.

Through the above-described procedure, a transmission job is executed and a transmission history is stored in the HDD 105. The following describes processing for displaying a transmission history screen based on the transmission history database 801 stored in the HDD 105 and printing a transmission result report.

<Displaying Transmission History Screen and Printing Transmission Result Report>

Figure 12:
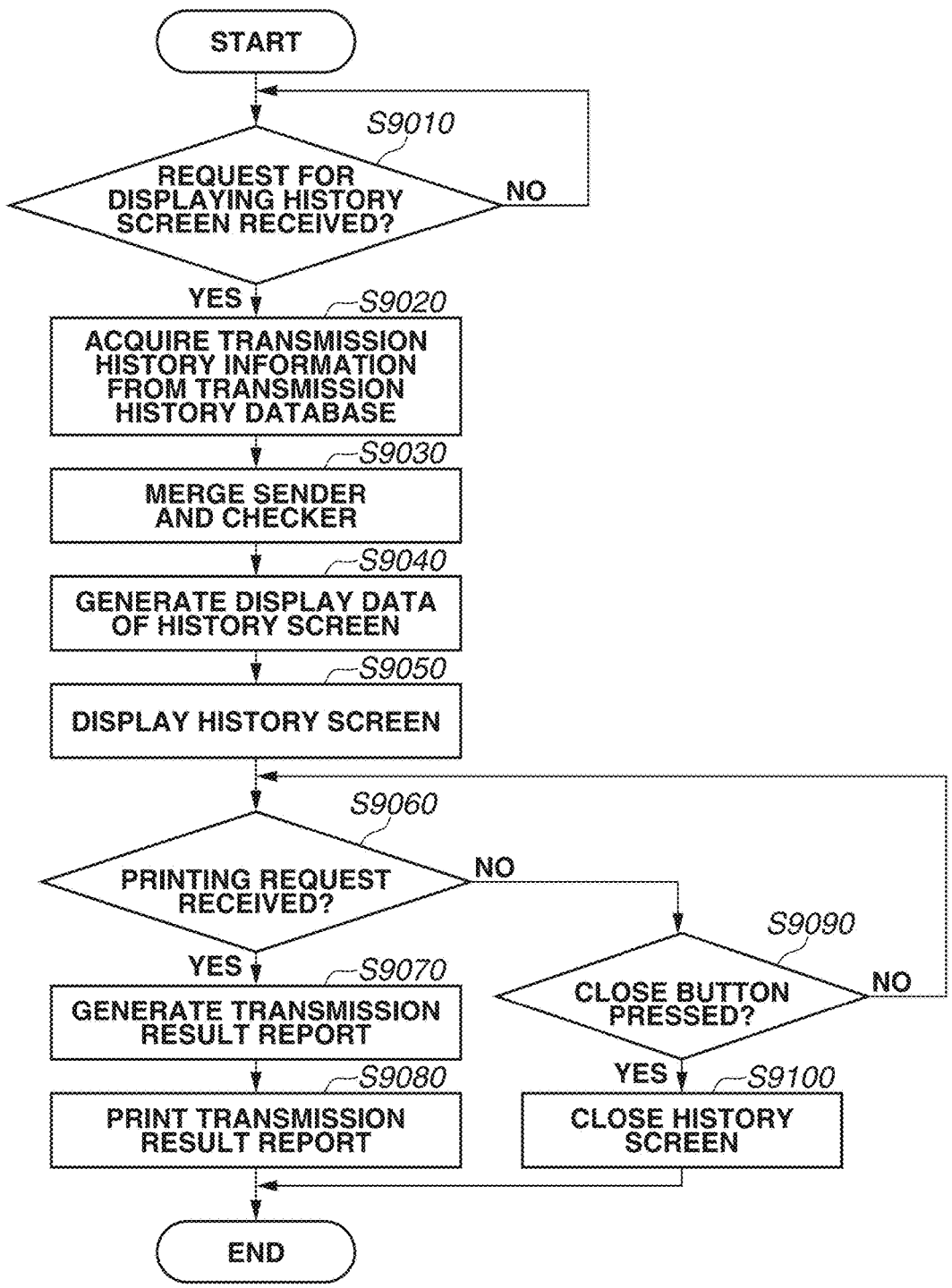
FIG. 12 is a flowchart illustrating an example of control according to the present exemplary embodiment.

FIG. 12 is a flowchart illustrating processing for displaying a transmission history screen and printing a transmission result report. The processing in the flowchart illustrated in FIG. 12 is implemented in such a manner that the CPU 101 loads a program stored in the ROM 102 into the RAM 103 and then executes the program.

In step S9010, the CPU 101 determines whether a request for displaying the history screen is received via the operation unit 104. In a case where the CPU 101 determines that the request for displaying the history screen is not received (NO in step S9010), the CPU 101 repeats processing in step S9010 until the request is received. In a case where the CPU 101 determines that the request for displaying the history screen is received (YES in step S9010), the processing proceeds to step S9020.

In step S9020, the CPU 101 reads transmission history information of the transmission history database 801 stored in the HDD 105. In this case, the CPU 101 reads the transmission history information for the number of records that can be displayed at one time on one screen.

In step S9030, the CPU 101 merges the sender's information and the checker's information, each of which are stored in association with a management number included in the transmission history information. More specifically, the CPU 101 merges these pieces of information to achieve the format of the "sender (checker)".

In step S9040, the CPU 101 generates a history screen including the sender's information and the checker's information merged with each other.

In step S9050, the CPU 101 displays the history screen generated in step S9040 on the operation unit 104. FIG. 13 is a diagram illustrating an example of a transmission history screen. A transmission history screen 880 includes columns of start time, transmission destination, sender (checker), management number, communication sheet count, and communication result. One record corresponds to one transmission job. The transmission history screen 880 illustrated in FIG. 13 includes a print button 881 and a close button 882.

In step S9060, the CPU 101 determines whether a printing request is received via the print button 881. In a case where the CPU 101 determines that the printing request is received (YES in step S9060), the processing proceeds to step S9070. In a case where the CPU 101 determines that the printing request is not received (NO in step S9060), the processing proceeds to step S9090.

In step S9090, the CPU 101 determines whether the close button 882 is pressed. In a case where the CPU 101 determines that the close button 882 is not pressed (NO in step S9090), the processing proceeds to step S9060. In a case where the CPU 101 determines that the close button 882 is pressed (YES in step S9090), the processing proceeds to step S9100.

In step S9070, the CPU 101 generates a transmission result report based on the transmission result database 801 stored in the HDD 105.

In step S9080, the CPU 101 instructs the printer 112 to print the generated transmission result report on a sheet. FIG. 14 is a diagram illustrating an example of a transmission result report. A transmission result report 802 includes columns of start time, transmission destination, sender (checker), management number, and communication sheet count. One record corresponds to one transmission job.

In step S9100 (YES in step S9090), the CPU 101 instructs the operation unit 104 to end display of the transmission history screen 880. In this process, the CPU 101 displays a screen that is displayed before receiving the request for displaying the transmission history screen 880 in step S9010.

The above-described control enables, with reference to the transmission history screen 880 or the transmission result report 802, easily identifying afterwards who has checked the destination for each transmission job as a checker.

Even without a complicated procedure in which a checker enters the checker's signature into a record book and manages the signed record book, the above-described procedure enables, by operating the MFP 100, easily checking afterwards who has confirmed the transmission destination of image data as a checker.

The above-described procedure also enables checking afterwards whether a checker, different from a sender, has confirmed a destination for each transmission job.

In the above-described exemplary embodiment, the CPU 101 receives an instruction for printing transmission history information by the user, and prints a transmission history result report based on the transmission history information according to the received output instruction. However, the above-described exemplary embodiment is not limited thereto. The CPU 101 can determine whether a predetermined number of transmission history items are stored and, upon determination that the predetermined number of transmission history items is stored, print a transmission history result report. The CPU 101 can also determine whether a predetermined time has come, and upon determination that the predetermined time has come, print a transmission history result report.

Although the exemplary embodiment has been described above using an example of a facsimile transmission job, the exemplary embodiment is also applicable to an E-mail transmission job. In this case, the destination is not a telephone number but a mail address. In the case of E-mail, determination of whether the destination is an external line or an extension in step S6030 can be skipped.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016368, filed Jan. 29, 2016, which is hereby incorporated by reference herein in its entirety.

What is claimed is:

1. A communication apparatus comprising:
a user interface that receives a transmission destination;
a communication interface that transmits image data to the transmission destination received by the user interface;
an output device;
a memory; and
one or more processors that executes a set of instructions to;
obtain identification information of a user who inputs the transmission destination of the image data;
obtain identification information of a checker of the transmission of the transmission destination; and
store, in the memory, the received transmission destination, the obtained identification information of the user, and the obtained identification information of the checker as transmission history information of the image data, and
cause the output device to output the stored transmission history information.

2. The communication apparatus according to claim 1, wherein the output device prints the stored transmission history information.

3. The communication apparatus according to claim 1, wherein the output device displays the stored transmission history information.

4. The communication apparatus according to claim 1, wherein, in response to obtaining of the identification information of the checker, the communication interface transmits the image data.

5. The communication apparatus according to claim 1, wherein the user interface further receives a transmission request of the image data, and
wherein, after the user interface receives the transmission request, the one or more processors request the identification information of the checker.

6. The communication apparatus according to claim 5, wherein the one or more processors inquire whether the transmission destination has been confirmed after the user interface receives the transmission request.

7. The communication apparatus according to claim 6, wherein the communication interface does not transmit image data until the transmission destination has been confirmed after the inquiry is made.

8. The communication apparatus according to claim 1, wherein the one or more processor further authenticate the user based on the obtained identification information of the user.

9. The communication apparatus according to claim 1, wherein the output device outputs the transmission destination, the obtained identification information of the user, and the obtained identification information of the checker in association with each other.

10. The communication apparatus according to claim 1, wherein the received transmission destination, the obtained identification information of the user, and the obtained identification information of the checker are stored in association with a management number as transmission history information of the image data.

11. The communication apparatus according to claim 1, wherein the one or more processors request the identification information of the checker, and
wherein, after the one or more processors request the identification information of the checker, the one of more processor obtain the identification information of the checker.

12. The communication apparatus according to claim 11, wherein, in a case where the received transmission destination is a transmission destination of an external line, the one or more processors request the identification information of the checker, and
wherein, in a case where the received transmission destination is a transmission destination of an extension, the one or more processors do not request the identification information of the checker.

13. The communication apparatus according to claim 1, wherein the identification information of the checker is obtained from an IC card via wireless communication.

14. The communication apparatus according to claim 1, wherein the identification information of the checker is obtained from a keyboard.

15. A method for controlling a communication apparatus, the method comprising:
obtaining identification information of a user;
receiving, from the user via a interface, a transmission destination of image data;
requesting identification information of a checker of the transmission destination;
obtaining the identification information of the checker;
transmitting, via a communication interface, the image data to the received transmission destination,
storing, in memory, the received transmission destination, the obtained identification information of the user, and the obtained identification information of the checker as transmission history information of the image data; and outputting, via an output device, the stored transmission history information.

16. The method according to claim 15, further comprising outputting the stored transmission history information.

17. The method according to claim 16, wherein the outputting is printing the stored transmission history information.

18. The method according to claim 16, wherein the outputting is displaying the stored transmission history information.

19. The method according to claim 15, wherein, in response to obtaining of the identification information of the checker, the image data is transmitted.

20. The method according to claim 15, further comprising receiving a transmission request of the image data,
wherein, after receipt of the transmission request, the requesting requests the identification information of the checker.

21. The method according to claim 20, further comprising inquiring whether the transmission destination has been confirmed after the receipt of the transmission request.

22. The method according to claim 21, further comprising inhibiting transmission of the image data until the transmission destination has been confirmed after the inquiry is made.

23. The method according to claim 15, further comprising authenticating the user based on the obtained identification information of the user.

24. The method according to claim 16, wherein the outputting outputs the transmission destination, the obtained identification information of the user, and the obtained identification information of the checker in association with each other.

25. The method according to claim 15, wherein the received transmission destination, the obtained identification information of the user, and the obtained identification information are stored in association with a management number as transmission history information of the image data.

26. The method according to claim 15, further comprising requesting the identification information of the checker,
wherein, after the identification information of the checker is requested, the identification information of the checker is obtained.

27. The method according to claim 26,
wherein, in a case where the received transmission destination is a transmission destination of an external line, the requesting requests the identification information of the checker, and
wherein, in a case where the received transmission destination is a transmission destination of an extension, the requesting does not request the identification information of the checker.

28. The method according to claim 15, wherein the identification information of the checker is obtained from an IC card via wireless communication.

29. The method according to claim 15, wherein the identification information of the checker is obtained from a keyboard.

30. A non-transitory computer-readable storage medium storing computer executable instructions for executing a method for controlling a communication apparatus, the method comprising:
obtaining identification information of a user:
receiving, from the user via a user interface, a transmission destination of image data;
requesting identification information of a checker of the transmission destination;
obtaining the identification information of the checker;
transmitting, via a communication interface, the image data to the received transmission destination,
storing, in memory, the received transmission destination, the obtained identification information of the user, and the obtained identification information of the checker as transmission history information of the image data; and
outputting, via an output device, the stored transmission history information.

* * * * *